(12) United States Patent
Lee et al.

(10) Patent No.: US 7,894,001 B2
(45) Date of Patent: Feb. 22, 2011

(54) HUE ADJUSTING SYSTEM AND METHOD THEREOF

(75) Inventors: Wei-Kuo Lee, Hsin-Chu Hsien (TW); Yi-Fan Chen, Tai-Chung (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1259 days.

(21) Appl. No.: 11/456,867

(22) Filed: Jul. 12, 2006

(65) Prior Publication Data
US 2007/0211177 A1  Sep. 13, 2007

(30) Foreign Application Priority Data
Mar. 9, 2006 (TW) .............................. 95107991 A

(51) Int. Cl.
*H04N 9/64* (2006.01)
(52) U.S. Cl. .................. 348/649; 348/645; 348/630
(58) Field of Classification Search ............. 348/645, 348/649, 630, 453, 612, 617, 624, 586, 222.1, 348/223.1, 651, 659–660, 703, 708; 345/603–604, 345/600, 589, 590; 382/167; 358/518, 520; *H04N 9/64*
See application file for complete search history.

(56) References Cited

U.S. PATENT DOCUMENTS

| 5,282,021 | A | 1/1994 | Bachmann |
| 5,333,070 | A | 7/1994 | Ichikawa |
| 5,764,308 | A * | 6/1998 | Lee .............................. 348/649 |
| 7,098,965 | B2 * | 8/2006 | Kim ............................ 348/649 |
| 7,483,082 | B2 * | 1/2009 | Chou .......................... 348/645 |
| 7,551,774 | B2 * | 6/2009 | Matsubara .................. 382/167 |
| 2003/0072016 | A1 | 4/2003 | Dalrymple |
| 2004/0021671 | A1 | 2/2004 | Leyvi |
| 2005/0264580 | A1 | 12/2005 | Higgins |

FOREIGN PATENT DOCUMENTS

| CN | 1764282 A | 4/2006 |
| JP | 8-140120 | 5/1996 |
| JP | P2000-231624 A | 8/2000 |
| KR | 2003-0030644 | 4/2003 |

* cited by examiner

*Primary Examiner*—Trang U Tran
(74) *Attorney, Agent, or Firm*—Winston Hsu; Scott Margo

(57) ABSTRACT

The present invention provides a hue control system for adjusting a hue of a specified color. The system includes a hue determining circuit and a hue adjusting circuit. The hue determining circuit receives a plurality of color signals of the specified color and a plurality of hue adjusting values each corresponding to one color. The hue determining circuit generates a target hue value according to the color signals and the hue adjusting values. The hue adjusting circuit is coupled to the hue determining circuit. The hue adjusting circuit receives the color signals and the target hue value, and adjusts the hue of the color signals according to the target hue value.

14 Claims, 7 Drawing Sheets

HUE ADJUSTING SYSTEM AND METHOD THEREOF

BACKGROUND OF THE INVENTION

1. Field of the Invention

The invention relates to a hue adjusting system and related method thereof, and more particularly, to a hue adjusting system capable of independently adjusting the hues of different colors and a related method thereof.

2. Description of the Prior Art

Hue is a necessary value in the determination of a color. When a picture is viewed, the hue of a picture will influence the comfort of a person watching the picture. In general, a display provides a function of adjusting the hue of the screen to enable the user to have maximum comfort. In current displays, however, when the hue is being adjusted, the same adjusting value is utilized to adjust the hues of different colors so the adjusting degree of each color is also the same. Therefore, the adjustability of the hue of the screen is limited, resulting in a user being unable to adjust the display easily to meet their personal requirements.

SUMMARY OF THE INVENTION

It is therefore one of the primary objectives of the claimed invention to provide a hue adjusting system and related method thereof, to solve the above-mentioned problem.

According to an exemplary embodiment of the claimed invention, a system for adjusting a hue of a target color is disclosed. The system comprises: a hue determining circuit, for receiving a plurality of color signals corresponding to the target color and a plurality of hue adjusting values each corresponding to one color, and generating a target hue adjusting value according to the plurality of color signals and the plurality of hue adjusting values; and a hue adjusting circuit, for receiving the plurality of color signals and the target hue adjusting value, and adjusting hue angles of the plurality of color signals according to the target hue adjusting value in order to adjust the hue of the target color.

According to another exemplary embodiment of the claimed invention, a method for adjusting a hue of a target color is disclosed. The method comprises: analyzing a plurality of color signals representing the target color, and generating a target hue adjusting value according to an analyzing result and a plurality of hue adjusting values each corresponding to one color; and adjusting hue angles of the plurality of color signals according to the target hue adjusting value to adjust the hue of the target color.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
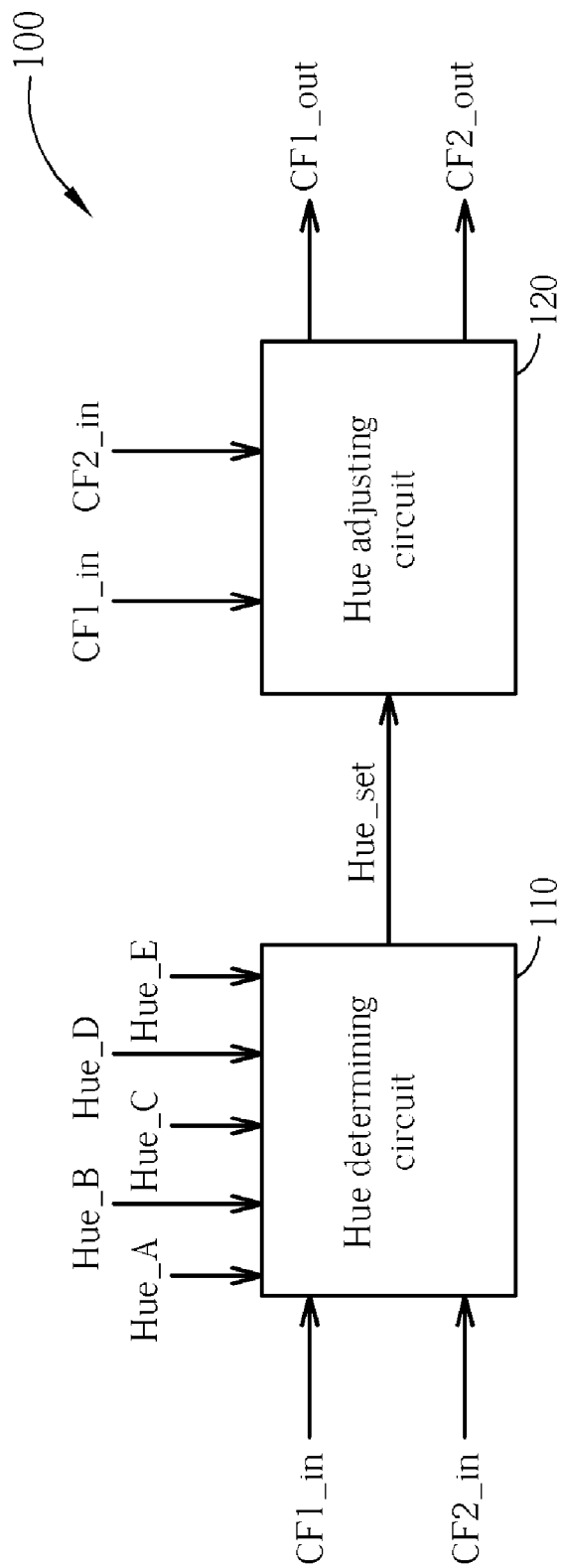
FIG. 1 is a block diagram of a hue adjusting system according to the present invention.

Please refer to FIG. 1, which is a block diagram of a hue adjusting system 100 according to the present invention. As shown in FIG. 1, the hue adjusting system 100 comprises a hue determining circuit 110 and a hue adjusting circuit 120. First, a color space is selected, where the color space could be RGB, YUV, YCrCb, . . . , etc. A target color is represented by the selected color space. Taking the color space YCrCb as an example, after the target color is analyzed, two chrominance signals CF1_in and CF2_in can be obtained. For example, the chrominance signal CF1_in corresponds to the Cr component of the YCrCb color space, and the chrominance signal CF2_in corresponds to the Cb component of the YCrCb color space. The hue determining circuit 110 receives the chrominance signals CF1_in and CF2_in corresponding to the target color and a plurality of hue adjusting values (for adjusting the hue angles) Hue_A, Hue_B, Hue_C, Hue_D, and Hue_E corresponding to different colors. The five hue adjusting values Hue_A, Hue_B, Hue_C, Hue_D, and Hue_E respectively correspond to different colors, such as five colors from the group comprising red, green, blue, yellow, brown, orange, purple. These hue adjusting values can be defined by the users. In other words, the user can determine a hue adjusting value, which is utilized to adjust one color. Please note that the five hue adjusting values are utilized as an embodiment, not a limitation of the present invention.

The hue determining circuit 110 generates a target hue adjusting value Hue_set (for adjusting the hue angle) according to the chrominance signals CF1_in and CF2_in and the hue adjusting values Hue_A, Hue_B, Hue_C, Hue_D, and Hue_E. The hue adjusting circuit 120 then adjusts the hue of the target color according to the target hue adjusting value Hue_set. That is, the hue adjusting circuit 120 adjusts the hue angles of the chrominance signals CF1_in and CF2_in and then generates adjusted chrominance signals CF1_out and CF2_out. The detailed operations and functions of the hue determining circuit 110 and the hue adjusting circuit 120 will be illustrated in the following disclosure.

Figure 2:
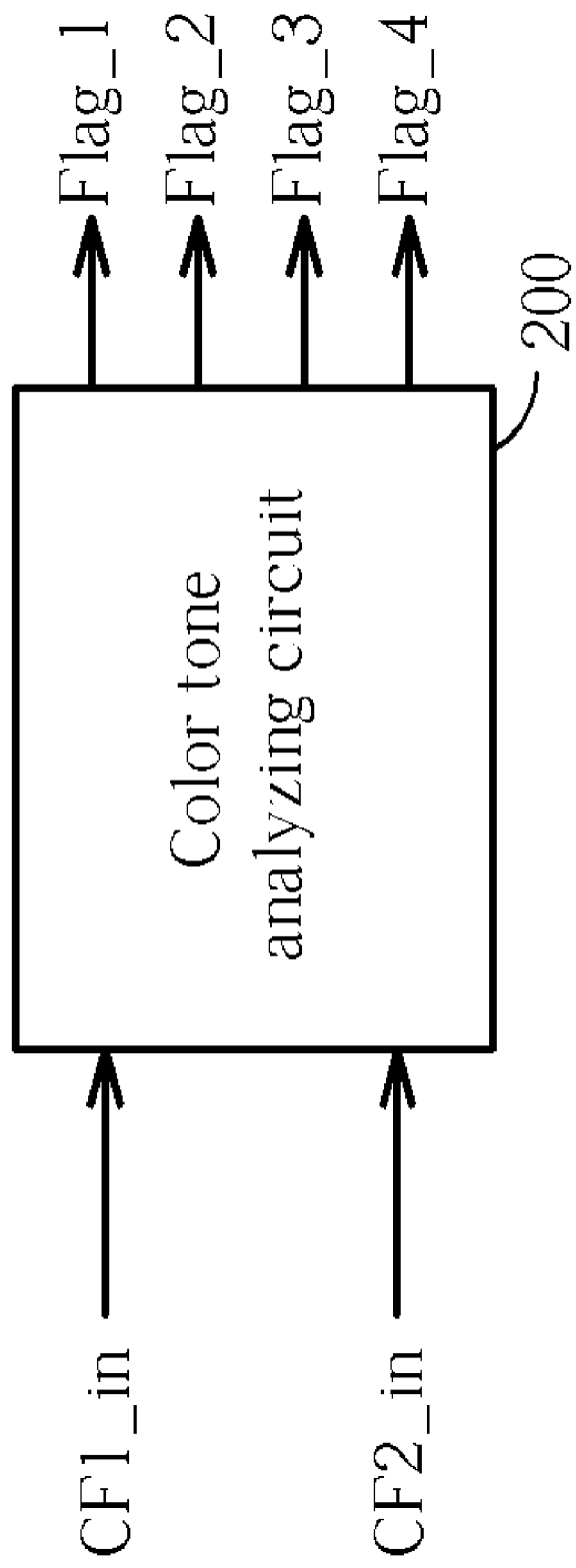
FIG. 2 is a block diagram of a color tone analyzing circuit according to the present invention.
Figure 3:
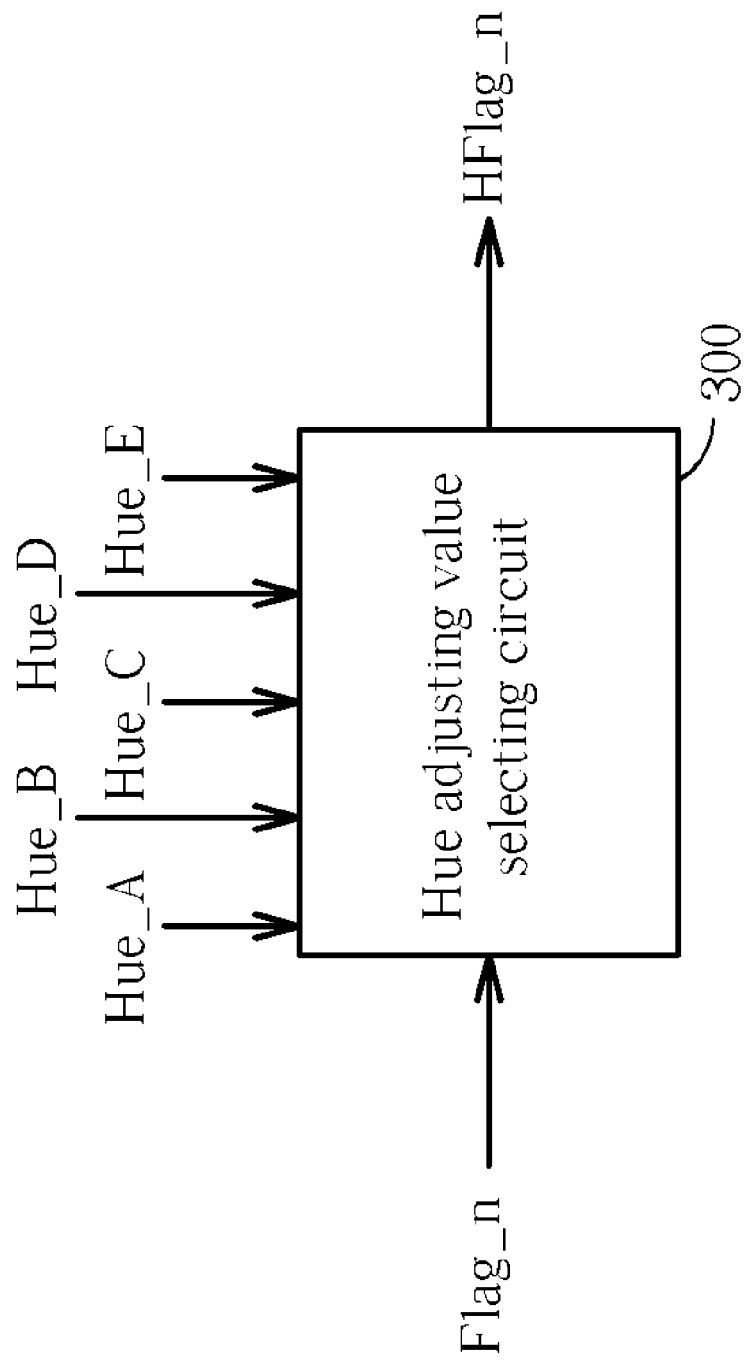
FIG. 3 is a block diagram of a hue adjusting value selecting circuit according to the present invention.
Figure 4:
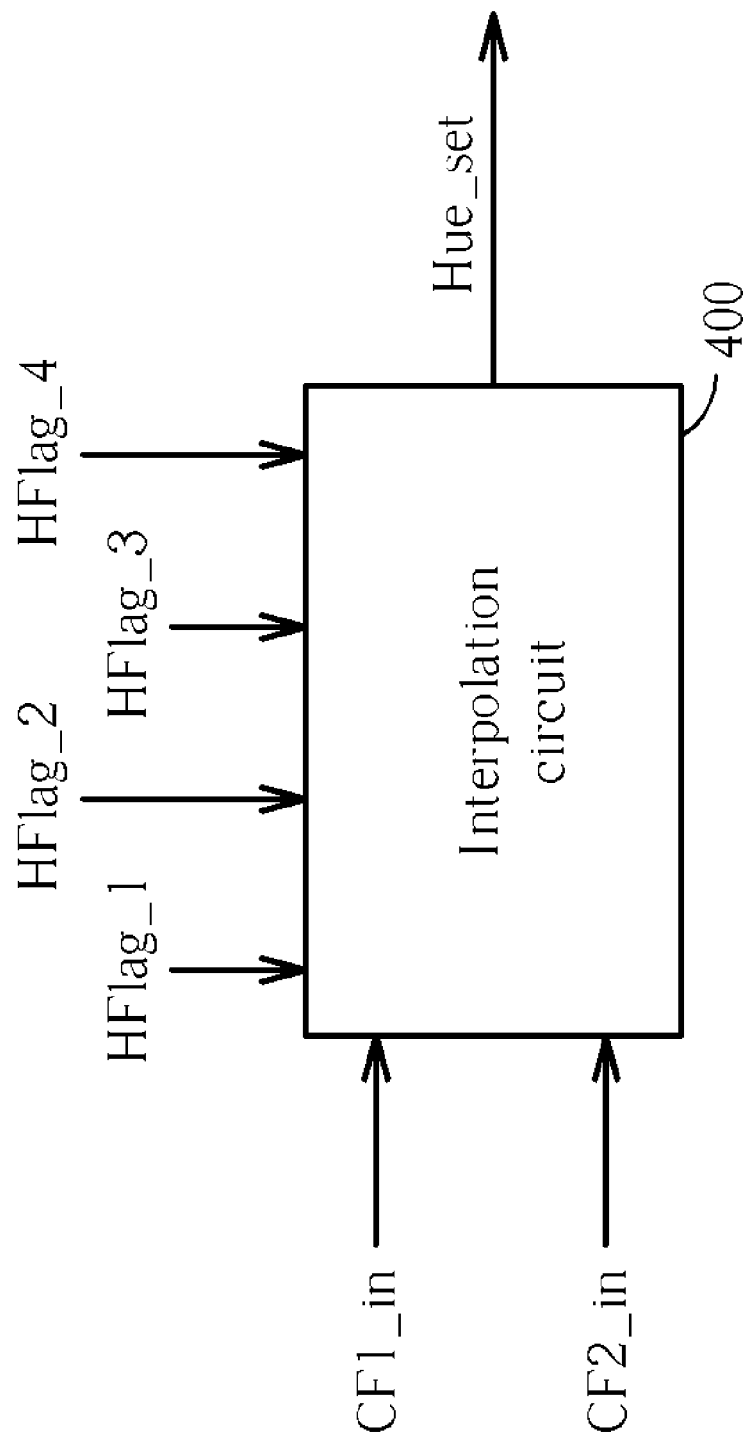
FIG. 4 is a block diagram of an interpolation circuit according to the present invention.

The hue determining circuit 110 comprises a color tone analyzing circuit 200, a hue adjusting value selecting circuit, and an interpolation circuit 400, respectively shown in FIG. 2, FIG. 3 and FIG. 4. Please refer to FIG. 2. The color tone analyzing circuit 200 first receives the chrominance signals CF1_in and CF2_in, and analyzes the chrominance signals CF1_in and CF2_in to obtain a plurality of color tones. In the actual implementation, the color tone analyzing circuit 200 can be a look-up table circuit (LUT) circuit. Furthermore, the color tone analyzing circuit 200 can further be a two-dimensional look-up table circuit. Assuming that the color tone signal CF1_in and CF2_in can be represented by a plurality of bits (e.g. 8 bits), the color tone analyzing circuit 200 refers most significant bits (MSB) of the chrominance signals CF1_in and CF2_in to use a look-up table method to obtain four color tone signals Flag_1, Flag_2, Flag_3 and Flag_4.

The hue adjusting value selecting circuit 300, as shown in FIG. 3, then selects one hue adjusting value from the above-mentioned adjusting values Hue_A, Hue_B, Hue_C, Hue_D, and Hue_E according to each color tone signal Flag_n (in this embodiment, n is equal to 1-4), and outputs corresponding hue adjusting value Hflag_n (in this embodiment, n is equal to 1-4).

Please note that in the actual implementation, the hue adjusting selecting circuit 300 can be accomplished through a multiplexer. In other words, the color tone signal Flag_can be utilized to determine a corresponding hue adjusting value Hflag_1, the color tone signal Flag_2 can be utilized to determine a corresponding hue adjusting value Hflag_2, the color tone signal Flag_3 can be utilized to determine a corresponding hue adjusting value Hflag_3, and the color tone signal Flag_4 can be utilized to determine a corresponding hue adjusting value Hflag_4.

The interpolation circuit 400, as shown in FIG. 4, then utilizes least significant bits (LSB) of the chrominance signals CF1_in and CF2_in to perform linear interpolations on the hue adjusting values HFlag_1-HFlag_4 to obtain the target hue adjusting value Hue_set according to the following equation:

$$\text{Hue\_set} = (A4 \times \text{HFlag\_1} + A3 \times \text{HFlag\_2} + A2 \times \text{HFlag\_3} + A1 \times \text{HFlag\_4})/(A1 + A2 + A3 + A4)$$

Figure 5:
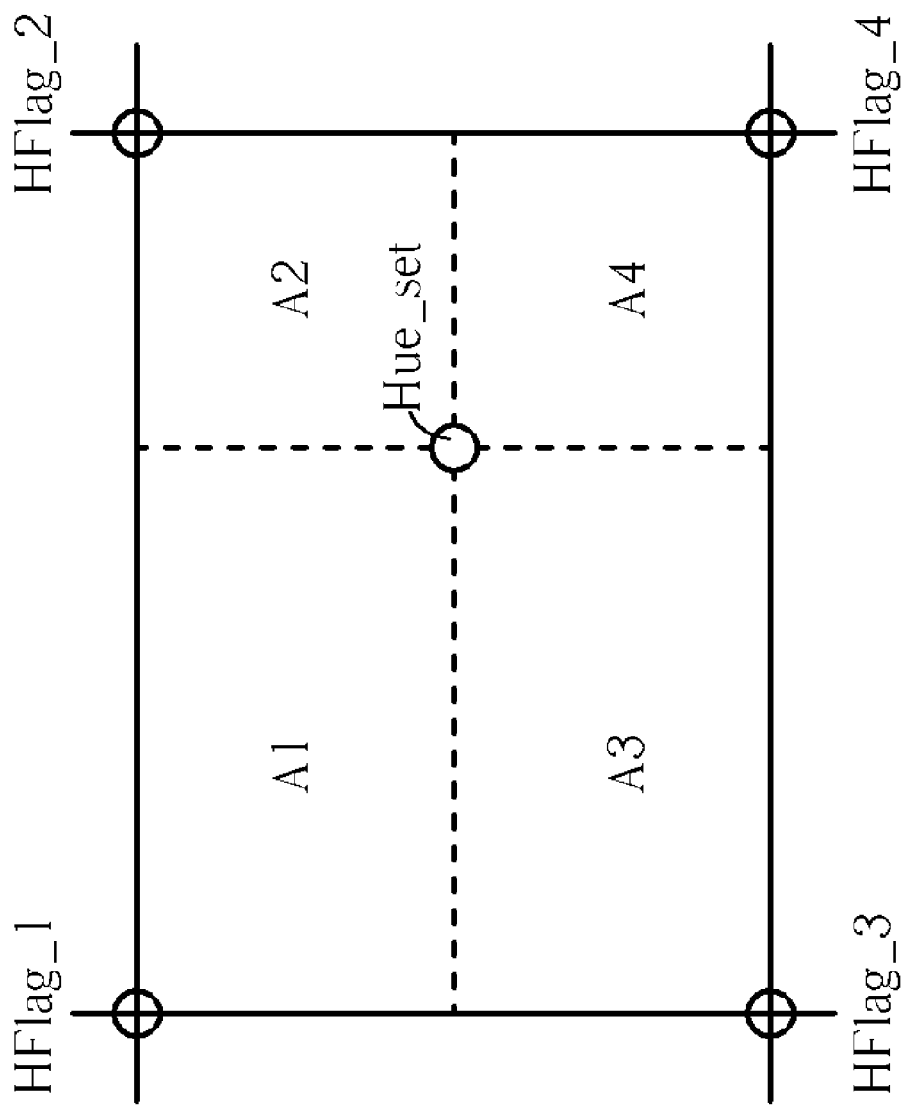
FIG. 5 is a diagram of an operation of the interpolation circuit shown in FIG. 4.

Please refer to FIG. 5. In the above equation, the target hue adjusting value Hue_set is determined through performing the interpolations on the least significant bits (LSB) of the chrominance signals CF1_in and CF2, where A1-A4 are the areas of the region surrounded by the hue adjusting values HFlag_1-HFlag_4 and divided by the target hue adjusting value Hue_set. Please note that the interpolation circuit 400 can be a dual linear interpolation circuit, or can be implemented by two single linear interpolation circuits.

Figure 6:
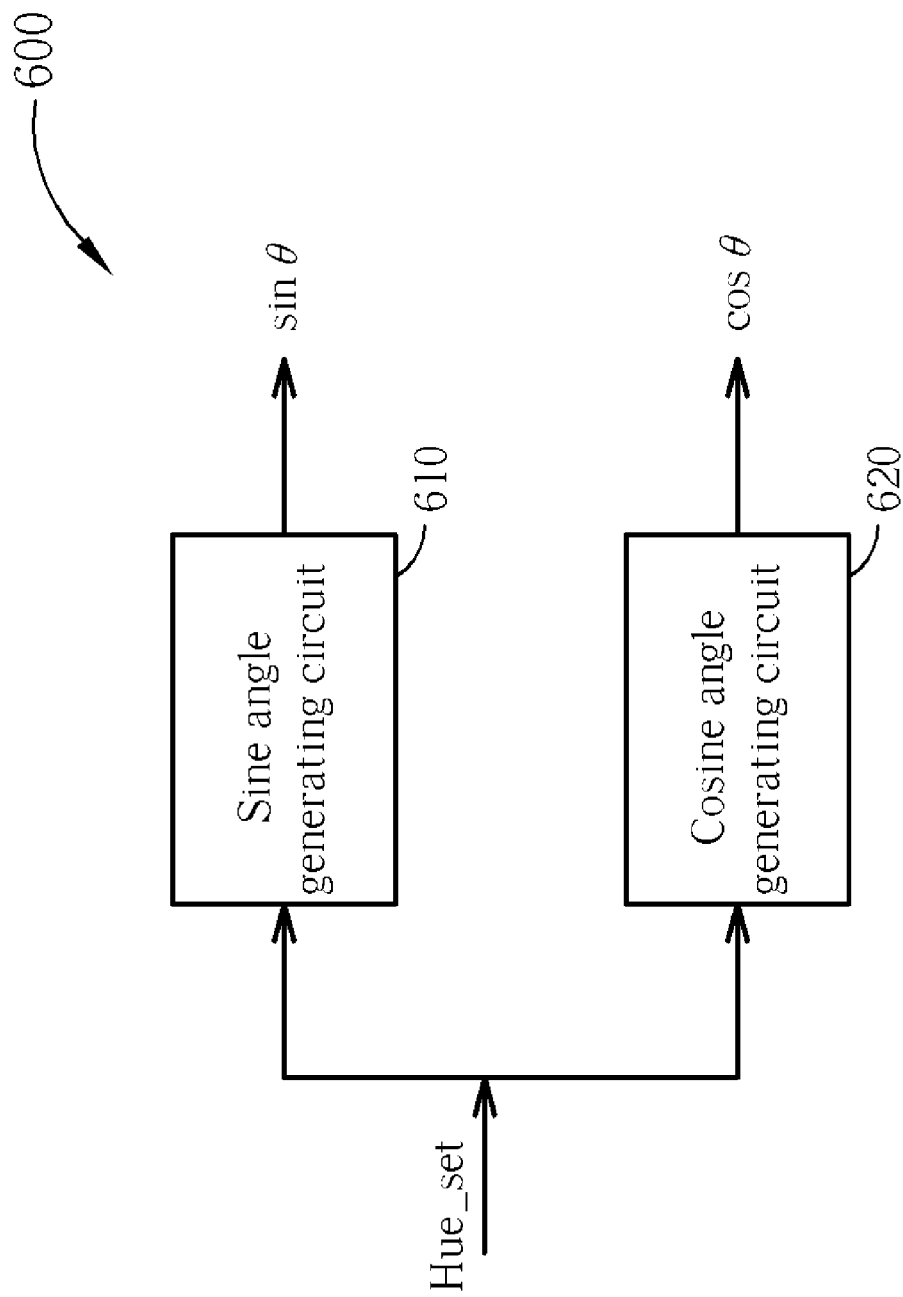
FIG. 6 is a block diagram of a hue angle generating circuit according to the present invention.
Figure 7:
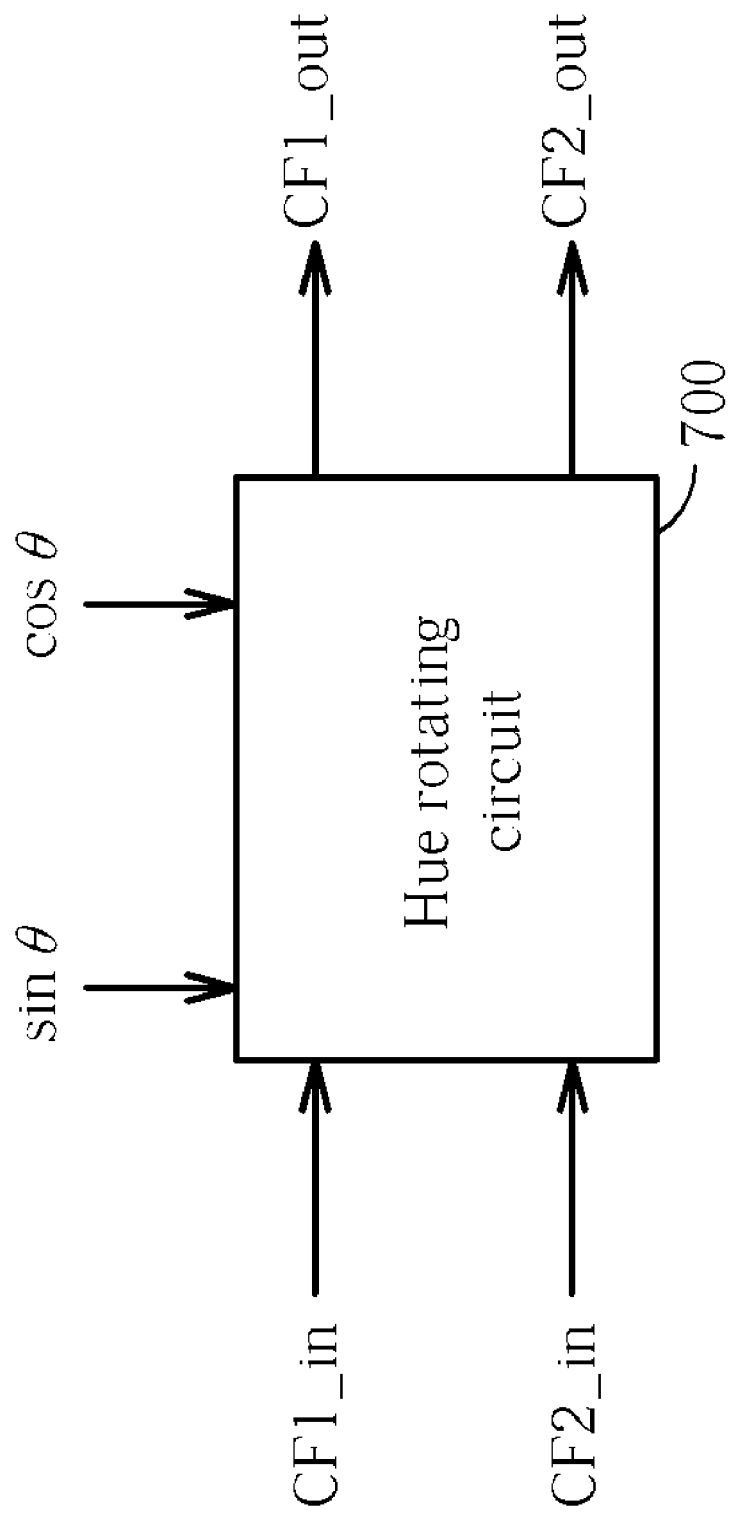
FIG. 7 is a block diagram of a hue rotating circuit according to the present invention.

In addition, the hue adjusting circuit 120 shown in FIG. 1 comprises a hue angle generating circuit 600 and a hue rotating circuit 700, respectively shown in FIG. 6 and FIG. 7. Please refer to FIG. 6 first. The hue angle generating circuit 600 comprises a sine angle generating circuit 610 and a cosine angle generating circuit 620. After the process of the sine angle generating circuit 610 and the cosine angle generating circuit 620 have been performed, the target hue adjusting value Hue_set is transformed into hue angle controlling signals sin θ and cos θ. In this embodiment, the sine angle generating circuit 610 and the cosine angle generating circuit 620 can be respectively implemented by look-up table circuits.

Please refer to FIG. 7. The hue rotating circuit 700 changes the hue of the chrominance signals CF1_in and CF2_in according to the hue angle controlling signals sin θ and cos θ. In other words, the hue rotating circuit 700 rotates the hue angles of the chrominance signals CF1_in and CF2_in according to the following equation such that the adjusted chrominance signals CF1_out and CF2_out can be generated.

$CF1\_out = CF1\_in \times \cos\theta + CF2\_in \times \sin\theta$ $CF2\_out = CF1\_in \times (-\sin\theta) + CF2\_in \times \cos\theta$ From the above disclosure, the present invention analyzes a target color, whose hue is to be adjusted, to obtain some color tones, and then finds out the hue adjusting value corresponding to each color tone. These hue adjusting values can be defined by the users, and then an interpolation can be performed on the above-mentioned hue adjusting values to obtain a target hue adjusting value corresponding to the target color. That is, for each target color, a corresponding target hue adjusting value can be obtained. In other words, the hue adjusting values corresponding to different colors can be different such that the present invention can be more flexible. In contrast to the prior art, the prior art needs to use the same hue adjusting value for all colors, but the present invention can flexibly utilize different hue adjusting values for different colors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for adjusting a hue of a target color, the system comprising:
   a hue determining circuit, receiving a plurality of color signals corresponding to the target color and a plurality of hue adjusting values corresponding to different colors, respectively, and generating a target hue adjusting value according to the plurality of color signals and the plurality of hue adjusting values; and
   a hue adjusting circuit, receiving the plurality of color signals and the target hue adjusting value, and adjusting hue angles of the plurality of color signals according to the target hue adjusting value to adjust the hue of the target color;
   wherein the hue determining circuit comprises:
      a color tone analyzing circuit, receiving the plurality of color signals, and transforming the plurality of color signals into a plurality of color tone signals;
      a hue adjusting value selecting circuit, receiving the plurality of hue adjusting values and the plurality of color tone signals, and selecting one hue adjusting value from the plurality of hue adjusting values according to each color tone signal; and
      an interpolation circuit, receiving the plurality of color signals and a plurality of selected hue adjusting values, and performing interpolations on the plurality of selected hue adjusting values according to the plurality of color signals to generate the target hue adjusting value.

2. The system of claim 1, wherein the color tone analyzing circuit is a look-up table (LUT) circuit.

3. The system of claim 2, wherein the plurality of color signals are chrominance signals.

4. The system of claim 2, wherein the look-up table circuit is a two-dimensional look-up table circuit.

5. The system of claim 1, wherein the hue adjusting value selecting circuit is a multiplexer.

6. The system of claim 1, wherein the interpolation circuit is a dual linear interpolation circuit.

7. The system of claim 1, wherein the hue adjusting circuit comprises:
   a hue angle generating circuit, for receiving the target hue adjusting value to generate at least one hue angle controlling signal; and
   a hue rotating circuit, coupled to the hue generating circuit, for receiving the plurality of color signals and the hue angle controlling signal, and rotating the hue angles of the plurality of color signals according to the hue angle controlling signal.

8. The system of claim 7, wherein the hue angle generating circuit is a look-up table circuit.

9. A method for adjusting a hue of a target color, the method comprising:
   analyzing a plurality of color signals representing the target color, and generating a target hue adjusting value according to an analyzing result and a plurality of hue adjusting values corresponding to different colors, respectively; and utilizing a hue adjusting circuit to adjust hue angles of the plurality of color signals according to the target hue adjusting value to adjust the hue of the target color;

wherein the step of generating the target hue adjusting value comprises:

transforming a plurality of color signals into a plurality of color tone signals;

selecting one hue adjusting value from the plurality of hue adjusting values according to each color tone signal; and performing interpolations on the plurality of selected hue adjusting values according to the plurality of color signals to generate the target hue adjusting value.

10. The method of claim 9, wherein the step of transforming the plurality of color signals into the plurality of color tone signals is implemented through a look-up table (LUT) technique.

11. The method of claim 10, wherein the look-up table technique is a two-dimensional look-up table technique.

12. The method of claim 9, wherein the step of generating the target hue adjusting value is implemented through using a dual linear interpolation operation.

13. The method of claim 9, wherein the step of adjusting the hue of the target color comprises:

generating a hue angle controlling signal according to the target color adjusting value; and rotating the hue angles of the plurality of color signals according to the hue angle controlling signal.

14. The method of claim 13, wherein the step of generating the hue angle controlling signal is implemented through a look-up table technique.

* * * * *